(12) United States Patent
Jiang et al.

(10) Patent No.: US 7,920,480 B2
(45) Date of Patent: Apr. 5, 2011

(54) SYSTEM AND METHOD TO DETERMINE BROADBAND TRANSPORT PERFORMANCE DATA

(75) Inventors: Baofeng Frank Jiang, Pleasanton, CA (US); G. Keith Cambron, Walnut Creek, CA (US); Jerold Daizo Osato, Pinole, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 298 days.

(21) Appl. No.: 11/847,447

(22) Filed: Aug. 30, 2007

(65) Prior Publication Data

US 2007/0291794 A1 Dec. 20, 2007

Related U.S. Application Data

(63) Continuation of application No. 10/761,141, filed on Jan. 20, 2004, now Pat. No. 7,362,713.

(51) Int. Cl.
*G01R 31/08* (2006.01)

(52) U.S. Cl. ........................................ 370/242; 370/252

(58) Field of Classification Search .................... None
See application file for complete search history.

(56) References Cited

U.S. PATENT DOCUMENTS

| | | | |
|---|---|---|---|
| 5,751,338 A | 5/1998 | Ludwig, Jr. | |
| 5,974,139 A | 10/1999 | McNamara et al. | |
| 5,987,061 A | 11/1999 | Chen | |
| 6,044,107 A | 3/2000 | Gatherer et al. | |
| 6,055,268 A | 4/2000 | Timm et al. | |
| 6,081,291 A | 6/2000 | Ludwig, Jr. | |
| 6,292,559 B1 | 9/2001 | Gaikwad et al. | |
| 6,317,495 B1 | 11/2001 | Gaikwad et al. | |
| 6,424,657 B1 | 7/2002 | Voit et al. | |
| 6,466,088 B1 | 10/2002 | Rezvani et al. | |
| 6,467,092 B1 | 10/2002 | Geile et al. | |
| 6,477,238 B1 | 11/2002 | Schneider et al. | |
| 6,498,791 B2 | 12/2002 | Pickett et al. | |
| 6,507,606 B2 | 1/2003 | Shenoi et al. | |
| 6,532,277 B2 | 3/2003 | Ulanskas et al. | |
| 6,538,451 B1 | 3/2003 | Galli et al. | |
| 6,549,568 B1 | 4/2003 | Bingel | |
| 6,570,855 B1 | 5/2003 | Kung et al. | |
| 6,597,689 B1 | 7/2003 | Chiu et al. | |
| 6,608,835 B2 | 8/2003 | Geile et al. | |
| 6,611,867 B1 * | 8/2003 | Bowman-Amuah | 709/224 |
| 6,614,781 B1 | 9/2003 | Elliott et al. | |
| 6,625,255 B1 | 9/2003 | Green et al. | |
| 6,640,239 B1 | 10/2003 | Gidwani | |

(Continued)

OTHER PUBLICATIONS

International Telecommunication Union, "Series G: Transmission Systems and Media, Digital Systems and Networks. Digital Sections and Digital Line System-Access Networks. Asymetric Digital Subscriber Line (ADSL) Transceivers- 2(ADSL2)," G.992.3, ITU-T. Jul. 2002, pp. 1-127.

(Continued)

*Primary Examiner* — Phirin Sam
(74) *Attorney, Agent, or Firm* — Toler Law Group

(57) ABSTRACT

A system and method of determining broadband transport performance data are provided. The system includes an input to receive a request including a telephone number corresponding to a broadband data transport element. The system also includes logic to map the telephone number to a port address of network equipment associated with the broadband data transport element. The system further includes a performance analysis tool to determine performance information associated with the broadband data transport element.

20 Claims, 9 Drawing Sheets

U.S. PATENT DOCUMENTS

| | | | |
|---|---|---|---|
| 6,643,266 B1 | 11/2003 | Pugaczewski | |
| 6,658,052 B2 | 12/2003 | Krinsky et al. | |
| 6,667,971 B1 | 12/2003 | Modarressi et al. | |
| 6,668,041 B2 | 12/2003 | Kamali et al. | |
| 6,674,725 B2 | 1/2004 | Nabkel et al. | |
| 6,674,749 B1 | 1/2004 | Mattathil | |
| 6,680,940 B1 | 1/2004 | Lewin et al. | |
| 6,697,768 B2 | 2/2004 | Jones et al. | |
| 6,700,927 B1 | 3/2004 | Esliger et al. | |
| 6,724,859 B1 | 4/2004 | Galli | |
| 6,728,238 B1 | 4/2004 | Long et al. | |
| 6,731,678 B1 | 5/2004 | White et al. | |
| 6,735,601 B1 | 5/2004 | Subrahmanyam | |
| 6,751,218 B1 | 6/2004 | Hagirahim et al. | |
| 6,751,315 B1 | 6/2004 | Liu et al. | |
| 6,751,662 B1 | 6/2004 | Natarajan et al. | |
| 6,754,283 B1 | 6/2004 | Li | |
| 6,762,992 B1 | 7/2004 | Lemieux | |
| 6,763,025 B2 | 7/2004 | Leatherbury et al. | |
| 6,765,864 B1 | 7/2004 | Natarajan et al. | |
| 6,765,918 B1 | 7/2004 | Dixon et al. | |
| 6,769,000 B1 | 7/2004 | Akhtar et al. | |
| 6,769,024 B1 | 7/2004 | Natarajan et al. | |
| 6,771,673 B1 | 8/2004 | Baum et al. | |
| 6,772,210 B1 * | 8/2004 | Edholm | 709/226 |
| 6,775,232 B1 | 8/2004 | Ah Sue et al. | |
| 6,775,267 B1 | 8/2004 | Kung et al. | |
| 6,775,268 B1 | 8/2004 | Wang et al. | |
| 6,775,273 B1 | 8/2004 | Kung et al. | |
| 6,778,525 B1 | 8/2004 | Baum et al. | |
| 6,782,082 B2 | 8/2004 | Rahamim | |
| 6,819,746 B1 | 11/2004 | Schneider et al. | |
| 6,940,864 B2 * | 9/2005 | Abdelilah et al. | 370/412 |
| 6,947,980 B1 | 9/2005 | Knudsen et al. | |
| 7,027,405 B1 | 4/2006 | Khadavi | |
| 7,046,675 B2 | 5/2006 | Lund | |
| 7,287,072 B1 * | 10/2007 | Dispensa et al. | 709/223 |
| 7,362,713 B2 * | 4/2008 | Jiang et al. | 370/242 |
| 7,471,771 B2 * | 12/2008 | Wahl et al. | 379/1.01 |
| 2003/0120803 A1 * | 6/2003 | Loughran et al. | 709/238 |
| 2003/0218984 A1 | 11/2003 | Tanaka | |
| 2004/0032879 A1 | 2/2004 | Keller-Tuberg et al. | |
| 2004/0095921 A1 | 5/2004 | Kerpez | |
| 2004/0260795 A1 | 12/2004 | Gentle et al. | |
| 2005/0033834 A1 * | 2/2005 | Nutt | 709/223 |
| 2005/0144272 A1 | 6/2005 | Herzberg | |
| 2005/0190780 A1 | 9/2005 | Bailey et al. | |
| 2006/0285648 A1 | 12/2006 | Wahl et al. | |
| 2007/0053292 A1 | 3/2007 | DePaul et al. | |

OTHER PUBLICATIONS

International Search Report for International Application No. PCT/US04/39621, mailed on Mar. 10, 2006.

Written Opinion of the International Searching Authority for PCT/US04/39621, mailed on Mar. 10, 2006.

* cited by examiner

US 7,920,480 B2

SYSTEM AND METHOD TO DETERMINE BROADBAND TRANSPORT PERFORMANCE DATA

CLAIM OF PRIORITY

The present application is a continuation application of and claims priority to U.S. patent application Ser. No. 10/761,141 filed on Jan. 20, 2004 now U.S. Pat. 7,362,713, which is expressly incorporated herein by reference in its entirety.

FIELD OF THE DISCLOSURE

The present application relates to a system and method of determining broadband transport performance data.

BACKGROUND

Historically, telephone facilities and the services provided over the telephone facilities had little in common. Today, asynchronous digital subscriber line (ADSL) is a service of an internet service provider (ISP) delivered over specialized ADSL network equipment that is in part owned by two other entities: the data service provider and the incumbent local exchange carrier (LEC). When the ADSL services does not work, the resolution of the problem may be tackled by three independent work groups: one belonging to each of the ISP, the owner of the data facilities (ASI), and the owner of the LEC access facilities. The entities perform their functions without recourse to a common set of performance data or analysis tools. This causes an inefficient process of trouble resolution, and has a negative impact on service downtime, leading to frustrated customers.

The telephone company personnel generally use a handheld modem tester positioned on the customer's circuit to test the line and gather performance data. This testing requires service disruption, dispatch of a technician to a customer's premises. The raw performance data requires analytical modeling to reduce the complex information to practical use.

ISP personnel had information about their internet servers but not about that portion of the circuit from the customer premises equipment (ADSL modem) to the transport facility point of handoff. While the data service provider has access to certain databases, this provider typically has limited availability to analyze real time data using analytical software tools. Accordingly, there is a need for an improved system and method of accessing and processing DSL data.

DETAILED DESCRIPTION OF THE DRAWINGS

Figure 1:
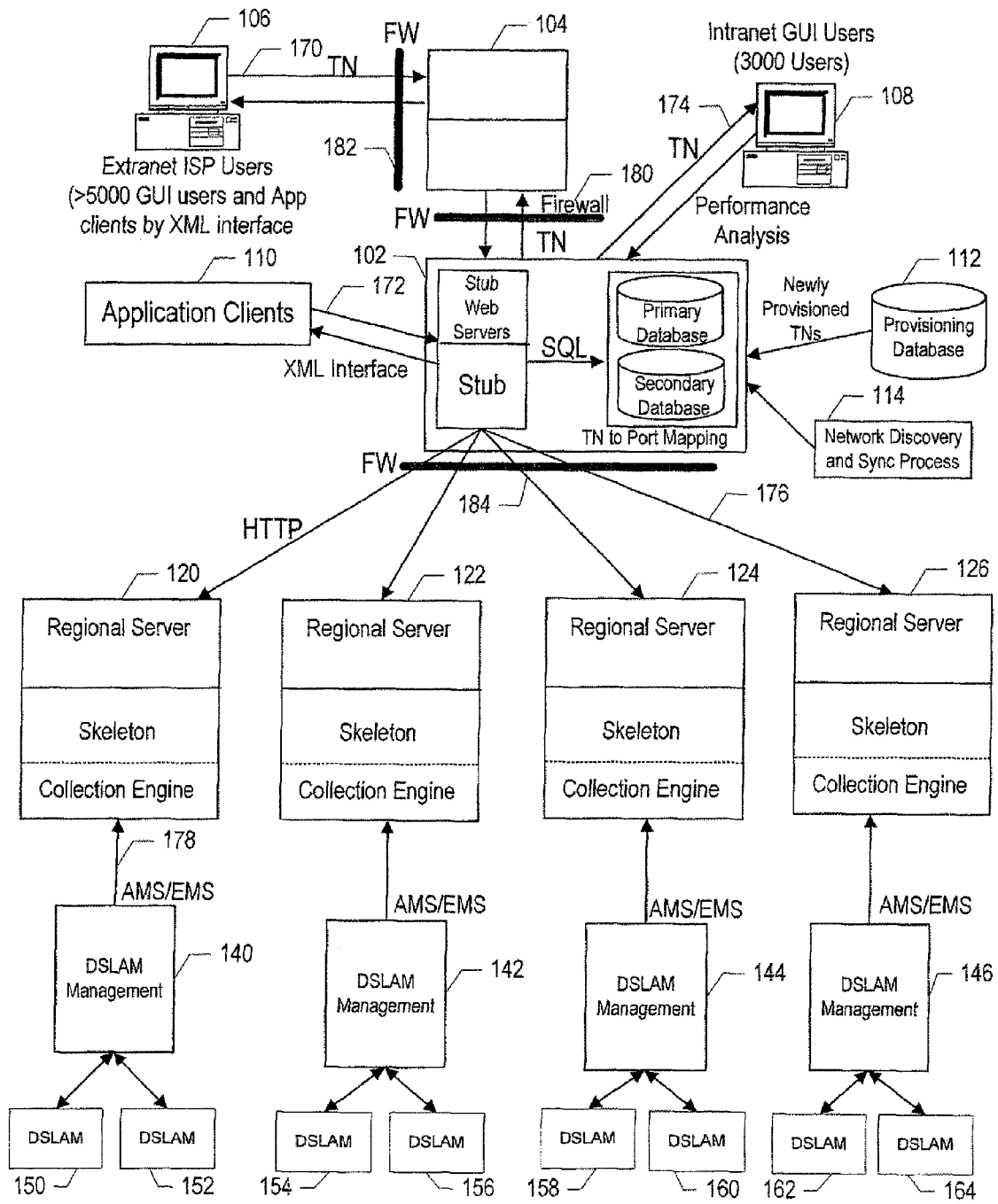
FIG. 1 is a block diagram of an embodiment of a system for accessing DSL data.

Referring to FIG. 1, a DSL network management system having application intranet and extranet user interfaces is illustrated. The system includes a first server, such as a resource center web server 104 having an input 170 with respect to an extranet 106. The system also includes a second server, such as a telephone number to port mapping server 102 and a plurality of regional servers 120, 122, 124, 126. The system further includes a plurality of digital subscriber line access multiplexer (DSLAM) management units 140, 142, 144, 146. Each of the DSLAM management units is coupled to a plurality of DSLAM equipment units, such as DSLAM equipment 150-164 as illustrated. In a particular embodiment, the DSLAM equipment supports a plurality of digital subscriber line (DSL) broadband communication links to end customer premises. The DSL links supported by the DSLAMs typically cover a diverse geographical area, such as across many states. For example, the particular illustrated system may include over six thousand DSLAMs covering over two million ADSL lines across thirteen different states.

The telephone number (TN) to port mapping server 102 is coupled to the resource center web server 104 via an intermediate firewall 180. The resource center web server 104 is coupled to the extranet ISP user system 106 via a firewall 182. The resource center web server 104 provides performance analysis data which may be displayed to the extranet ISP user via extranet ISP user system 106. The port mapping server 102 includes logic to provide an extensible markup language (XML) interface 172 to external application clients 110. The port mapping server 102 also provides a telephone number interface 174 and access to performance analysis to intranet users 108. The port mapping server 102 is further coupled to and responsive to provisioning database 112 and the network discovery and synchronization process module 114. The port mapping server 102 includes stub web servers and has access to a primary and secondary database to perform the telephone number to port mapping and performance analysis functions. An example database is implemented as an SQL type database. Server 102 is coupled to the regional servers 120-126 via firewall 184. Each of the regional servers 120-126 includes skeleton code and includes a data collection engine. Each regional server is coupled to a respective DSLAM management module via a communication line, such as TL1 line, labeled 178.

During system operation, an input telephone number is received at the resource center web server 104, from the extranet ISP user system 106. A telephone number is then passed to the port mapping server 102 across firewall 180 and is received at the stub web server. The stub web server performs a database query such as an SQL query, to the database units which perform telephone number to port mapping. The DSL multiplexer address port corresponding to the particular telephone number received is then provided by the database to logic within the stub portion of the port mapping server 102.

The port address is then provided across firewall 184 to a designated regional server that supports a particular DSLAM having the selected port address. The port address is provided to the appropriate regional server and the regional server then communicates the port address across the communication link to the respective DSLAM management unit. For example, where the selected regional server that supports the DSLAM matching a DSL line having the input telephone number is regional server 120, the port address is then provided to the DSLAM management unit 140 which then performs real time data collection of the performance of the associated DSL line, such as a DSL line supported by DSLAM 150. After the performance test is performed and real time data for the DSL line with the selected port address is collected at the DSLAM unit 140, the collected data is then received at the collection engine within the regional server 120 and is passed back to the port mapping server 102 for reporting to the appropriate user. For example, the raw data collected from regional server 120 may be processed by performance analysis tools and then the resulting processed and analyzed data may be reported to either application clients 110 intranet users 108, or extranet ISP users via extranet ISP user system 106.

In another method of operation, newly provisioned telephone numbers are set-up. In this example, where the telephone number matches a DSL line that needs to be provisioned, the stub web server within port mapping server 102 makes a query to the provisioning database 112 to provide a newly provisioned telephone number. The newly provisioned telephone number has a matching port address which is then provided to the appropriate regional server and the provisioning instructions as well as the port address are then provided to the respective DSLAM which provides the actual provisioning of the DSL circuit. A report on the provisioning and results of provisioning tests are then collected at the collection engine within the regional server and the provisioning report is then processed and provided to respective users, such as extranet users, intranet users, or application client users.

Figure 2:
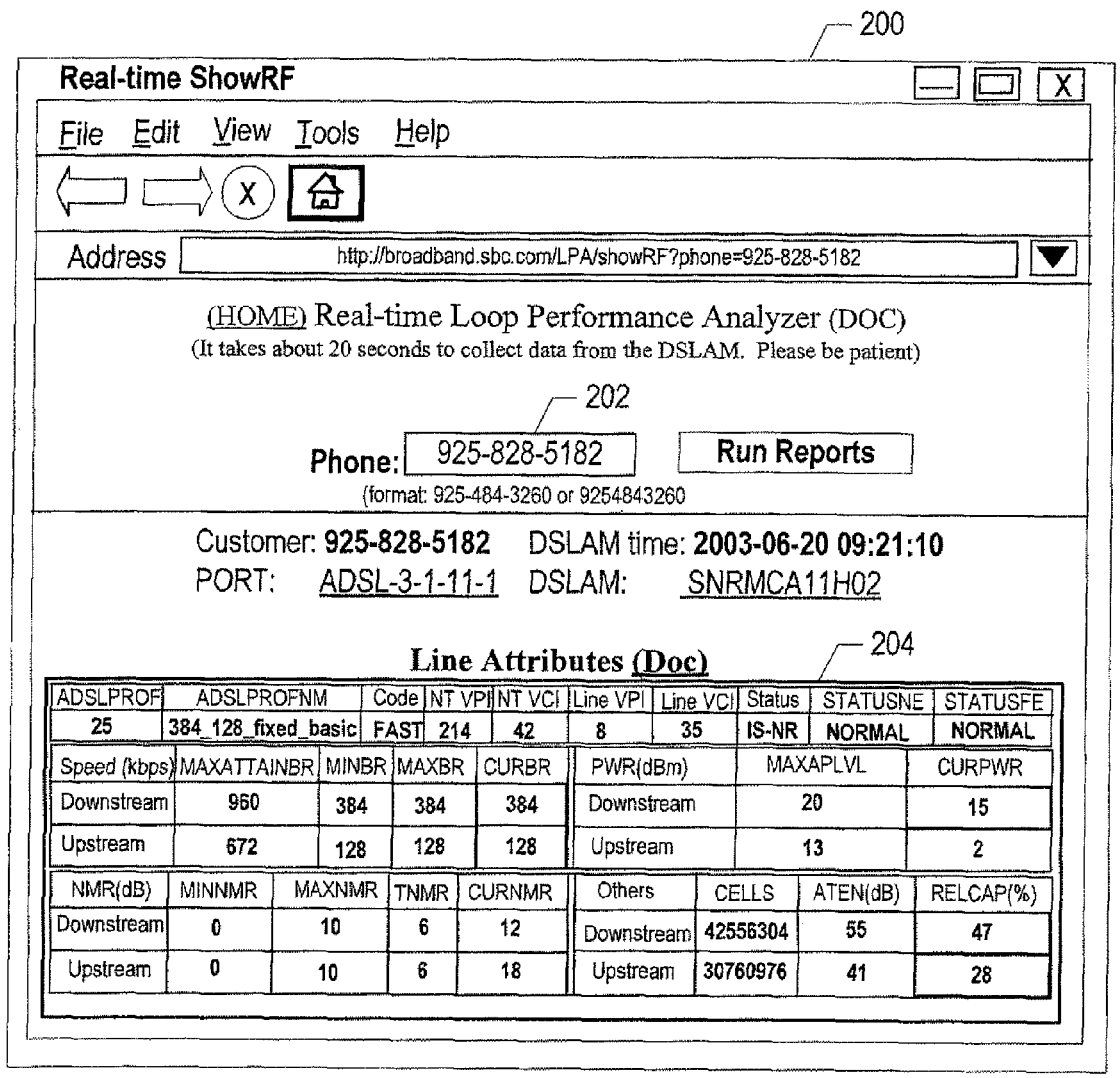
FIG. 2 is a general diagram of a screen shot that illustrates performance data that may be displayed on a user terminal.

An example of a DSL performance report that may be provided to a user of the system described in FIG. 1, is shown with respect to FIG. 2. For example, a report 200 that provides a real time loop performance analysis includes a report for a particular telephone number 202 and DSL line attributes 204 that were collected with respect to a port address matching or corresponding to the telephone number 202. An example of the data displayed includes a DSL performance matrix, bitrate transfer speeds, and data transfer bit errors.

Figure 3:
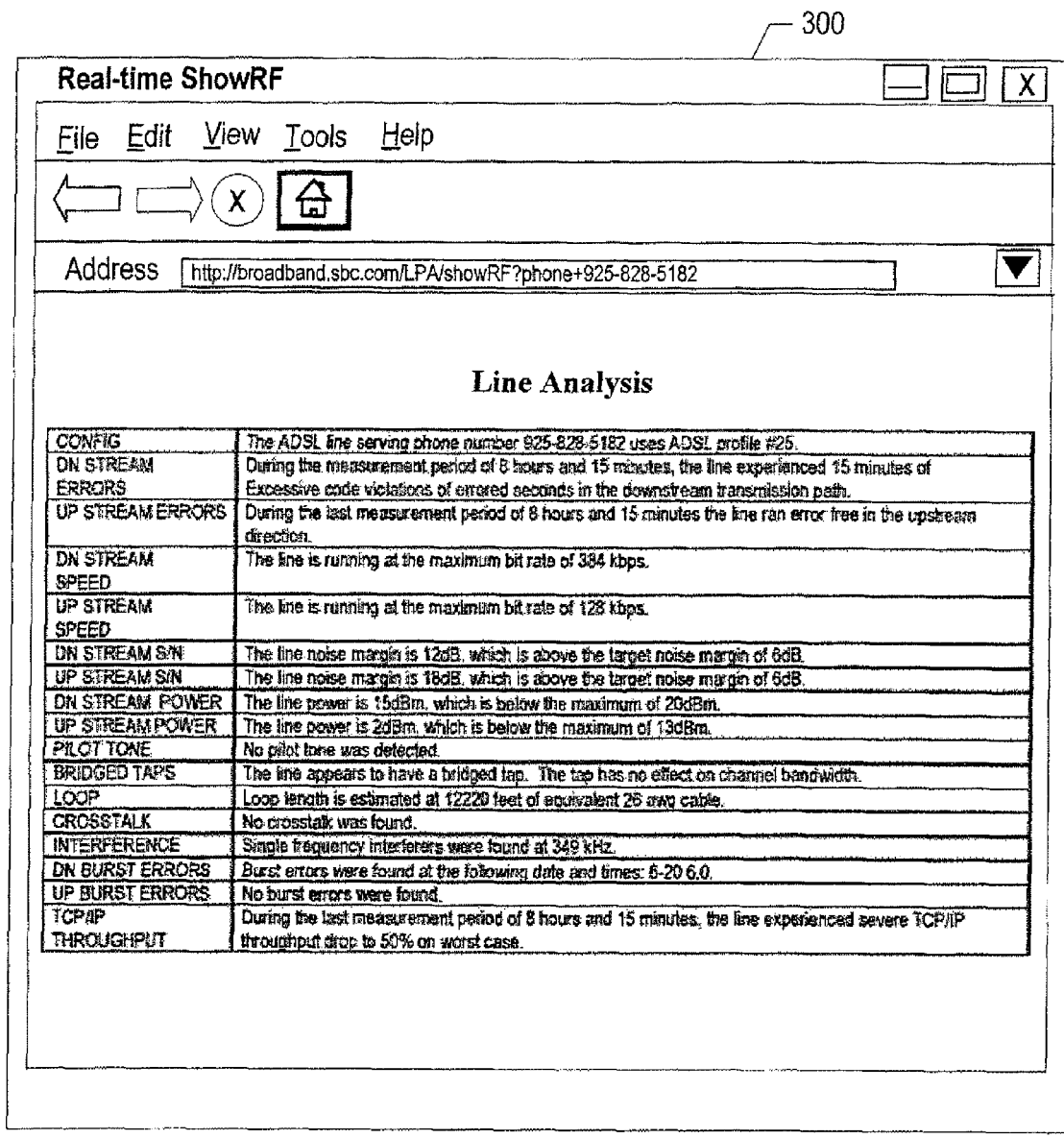
FIG. 3 is a general diagram of a screen shot of a line analysis display.

Referring to FIG. 3, another illustrative report 300 is shown. The report 300 is a DSL line analysis report that includes DSL parameters such as the particular ADSL line telephone number, downstream and upstream speed, downstream and upstream bit errors as well as other testing parameters, such as loop length, bridge taps, and pilot tone.

Figure 4:
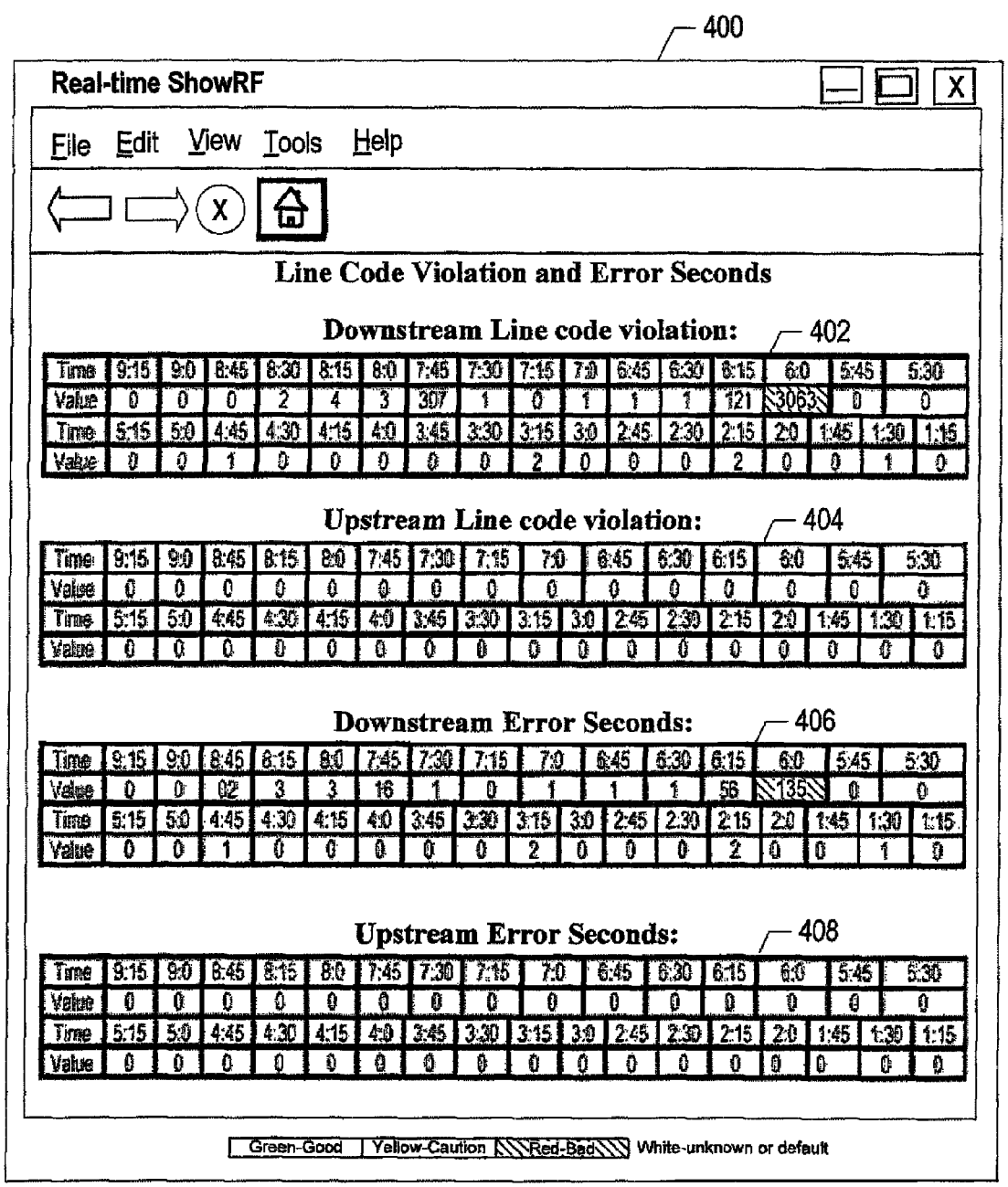
FIG. 4 is a general diagram of a screen shot of a line code violation data display.

Referring to FIG. 4, another illustrative report 400 is shown. The report 400 illustrates DSL line code violations and error second rates. The line code violations and error second report includes downstream line code violations 402, upstream line code violations 404, downstream error seconds 406, and upstream error seconds 408.

Figure 5:
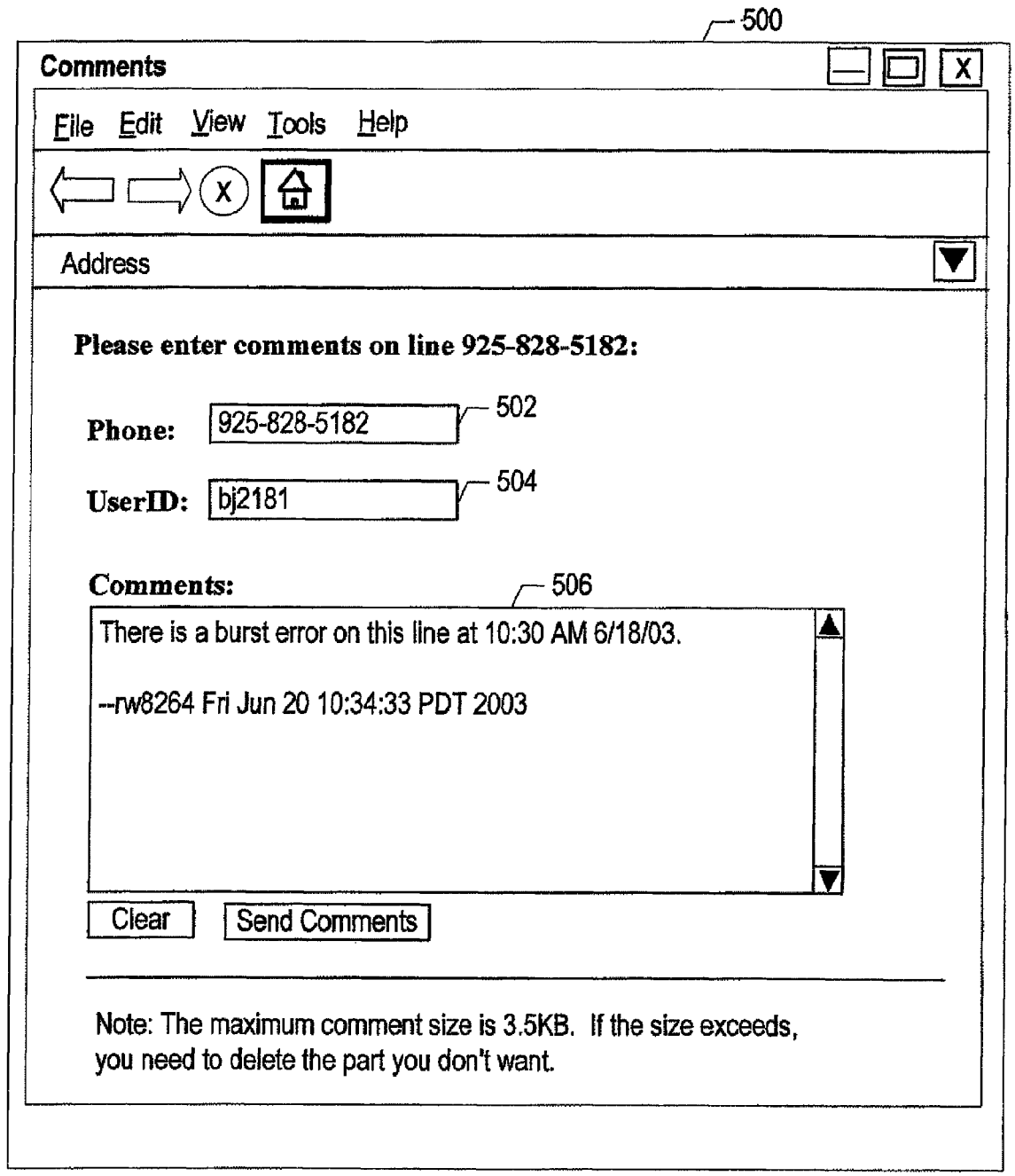
FIG. 5 is a general diagram of an input screen for a user.

Referring to FIG. 5, an input screen is shown that may be provided to a user interface such as an ISP user interface provided via extranet ISP user system 106. A particular input screen 500 allows an operator to enter a telephone number 502 and user ID 504 into the system and to provide reporting text 506 on a particular line condition, For example, an operations technician may identify a particular error on a DSL line, such as the indicated burst error with respect to the telephone number 502.

Figure 6:
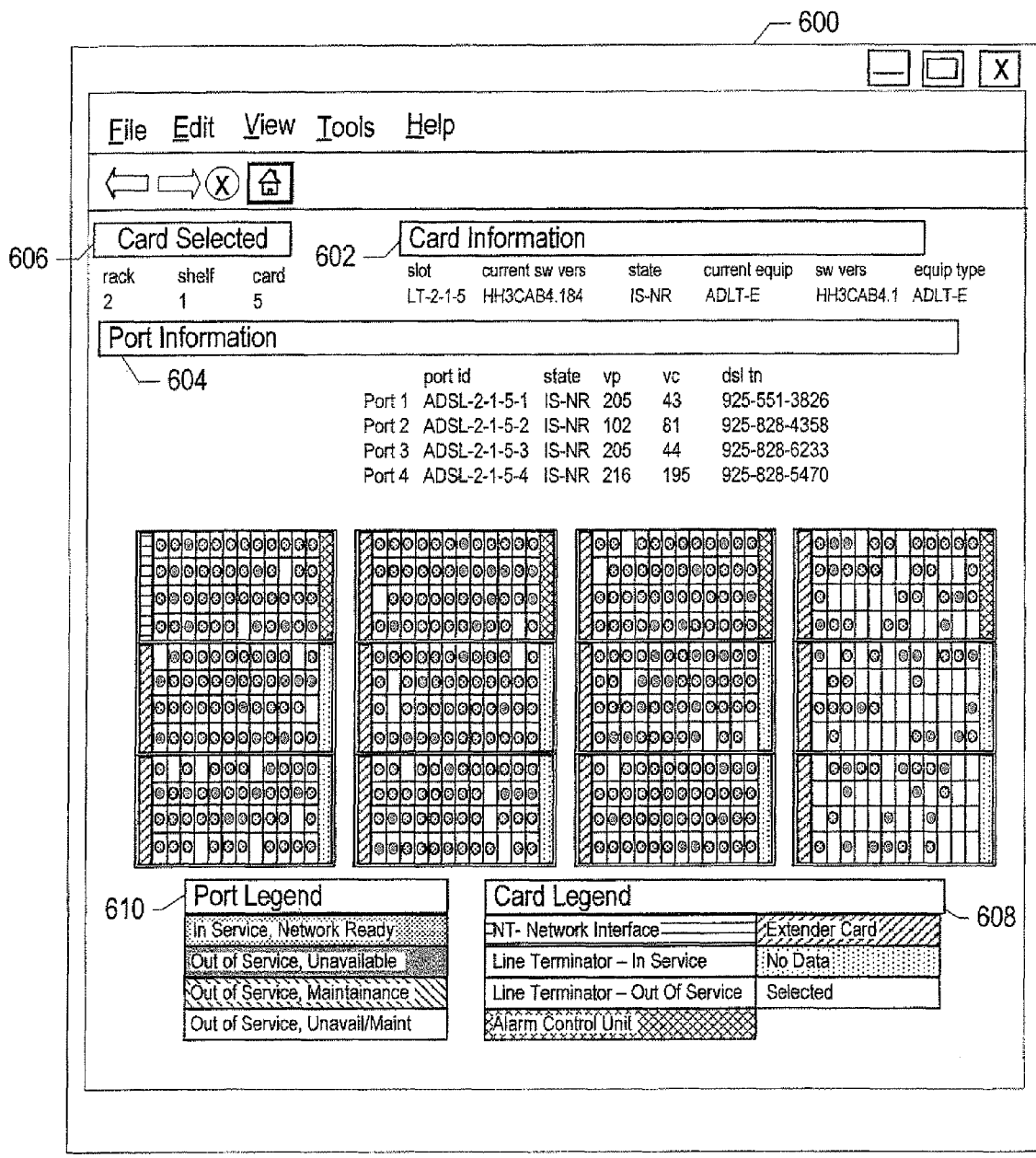
FIG. 6 is a general diagram of a screen shot of a line card display.

Referring to FIG. 6, another illustrative report 600 is shown, the report 600 includes circuit information for a particular DSL line, such as particular circuit card selected 606, DSL card information 602, and port information 604. The report 600 also includes additional information regarding a DSL line such as a port legend 610 and a particular circuit card legend 608. The report 600 is an example of a report of analyzed data that was collected in real time and provides an analysis for preferred presentation to an operator or user. Analytical tools may be used to help process the information retrieved and to present a user-friendly view of relevant data for the technical operator.

Figure 7:
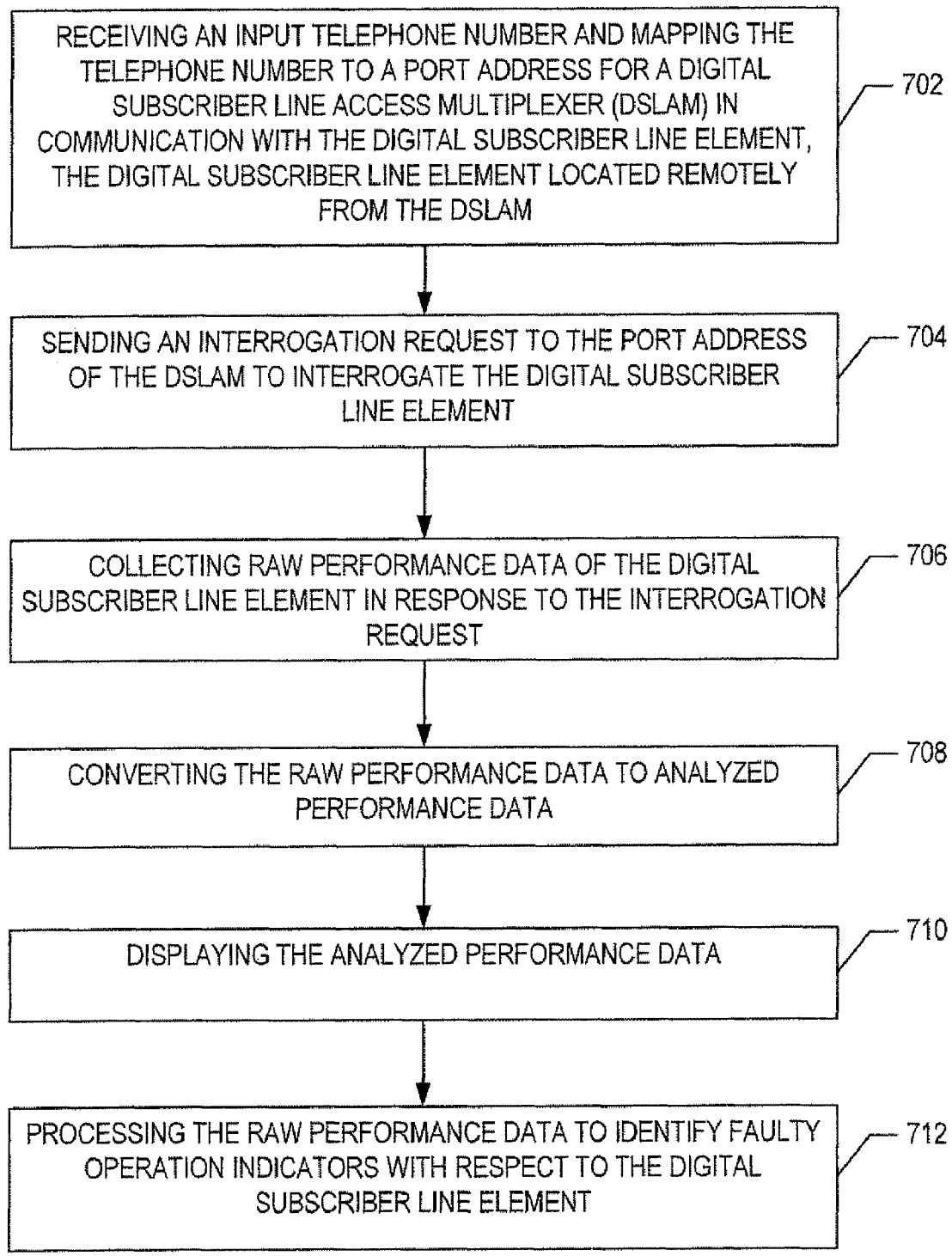
FIG. 7 is a flow chart that illustrates a particular embodiment of a method of accessing and displaying DSL data.

Referring to FIG. 7, a particular illustrative method of operation for the system of FIG. 1 is shown. A requested telephone number is received, at 702. A requested telephone number corresponds to a particular digital subscriber line (DSL) element. The telephone number is mapped to a port address for a digital subscriber line access multiplexer (DSLAM) that is in communication with the DSL element. The DSL element is located remotely from the DSLAM. An interrogation request to the port address of the DSLAM is then sent to interrogate the DSL element, at 704. Raw performance for the DSL element is collected in response to the interrogation request, at 706. The raw performance data collected for the DSL element is then converted to analyzed performance data, at 708. The analyzed performance data may be displayed, as shown in 710. Optionally, the raw performance data collected may be processed and analyzed to identify faulty operation indicators with respect to the DSL line, as shown at step 712. Examples of faulty operation indicators include bridge tap faults, single frequency interference faults, and disturber circuit faults. These faulty operation indicators typically correspond to conditions that reduce the data rate of the DSL line and such faulty operation indicators are often useful metrics to be reported to operations personnel.

Figure 8:
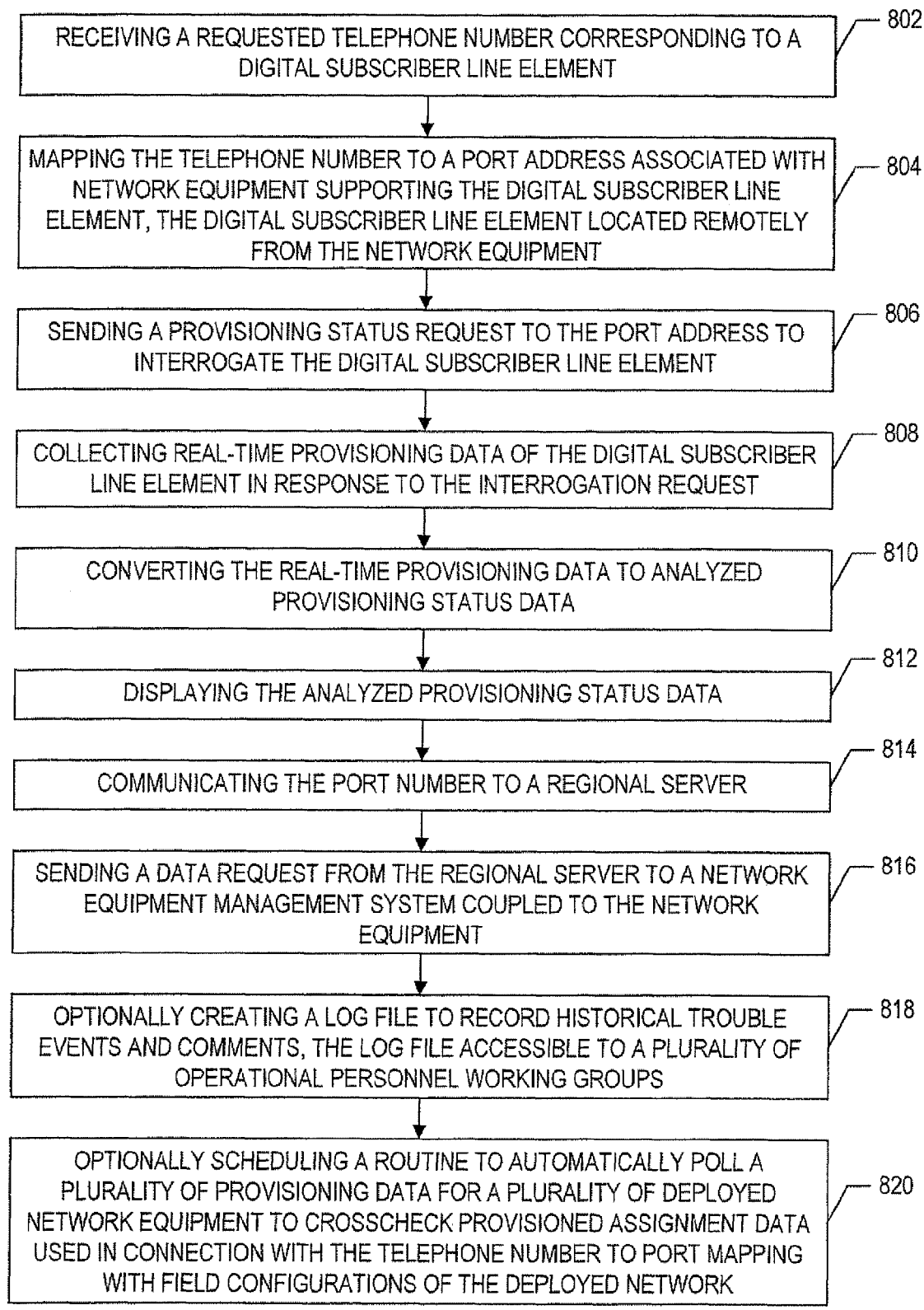
FIG. 8 is a flow chart that illustrates another particular embodiment of a method of accessing and displaying DSL data.

Referring to FIG. 8, another illustrative method of operation is shown. A requested telephone number is received, at 802. The requested telephone number corresponds to a particular DSL line. The telephone number received is then mapped to a port address associated with network equipment that supports the DSL line, at step 804. The DSL line element is located remotely from the network equipment. At step 806, a provisioning status request is sent to the port address to interrogate the DSL line element. Real-time provisioning data of the DSL element is the collected in response to the interrogation request, at step 808. The real-time provisioning data is analyzed to provide provisioning status data, as shown at step 810. The provisioning status data may then be displayed on a report, at step 812. In the illustrated embodiment, a port number is communicated from a server to a regional server prior to the provisioning status request. As shown at step 814, the port number being communicated to a regional server is useful where the system is a diverse system covering a wide geographical area. The regional server may send a data request to the network management system coupled to the network equipment, as shown at step 816, An example of the provisioning status data is a condition such as powered on, powered off, attempt to synchronize and end synchronization. The provisioning status data provided by the method illustrated in FIG. 8, may include provisioning parameters, such as equipment port status, cross connect stats, alarm status, and in-service status. In a particular embodiment, the provisioning data may be pulled with respect to many deployed network equipment elements to cross check provisioned assignment data used regarding telephone number to port mapping. Field configurations of the deployed network equipment may be verified.

In a particular embodiment, the requested telephone number may be received via a web browser interface provided by a gateway server and the telephone number may be mapped to the port address by a broadband server that is responsive to a gateway server. The broadband server may use an extensible mark-up (XML) language interface to an application client server. The application client server may have access to the broadband server and to a user of the web browser via a common set of software tools with respect to provisioning status data.

In another illustrative embodiment, a first entity uses the web browser interface while a second entity is using the client application for concurrent operation of the broadband server and access of network equipment data. The first entity may be an internet service provider (ISP) and the second entity may be a local exchange carrier, such as an operator of a telephony switch network. Referring to FIG. 8, a historical log file may be created to record historical trouble events and user comments, as shown at 818. The log file is accessible to a plurality of operational personnel working groups, such as via the intranet user interface. The operations of scheduling and launching an automated routine to poll the provisioning data of the distributed network elements is shown, at step 820. Thus, an automated routine with a scheduled application may be deployed using a computer-based system to provide for updated provisioning status data and real time data collection of provisioning status data.

Figure 9:
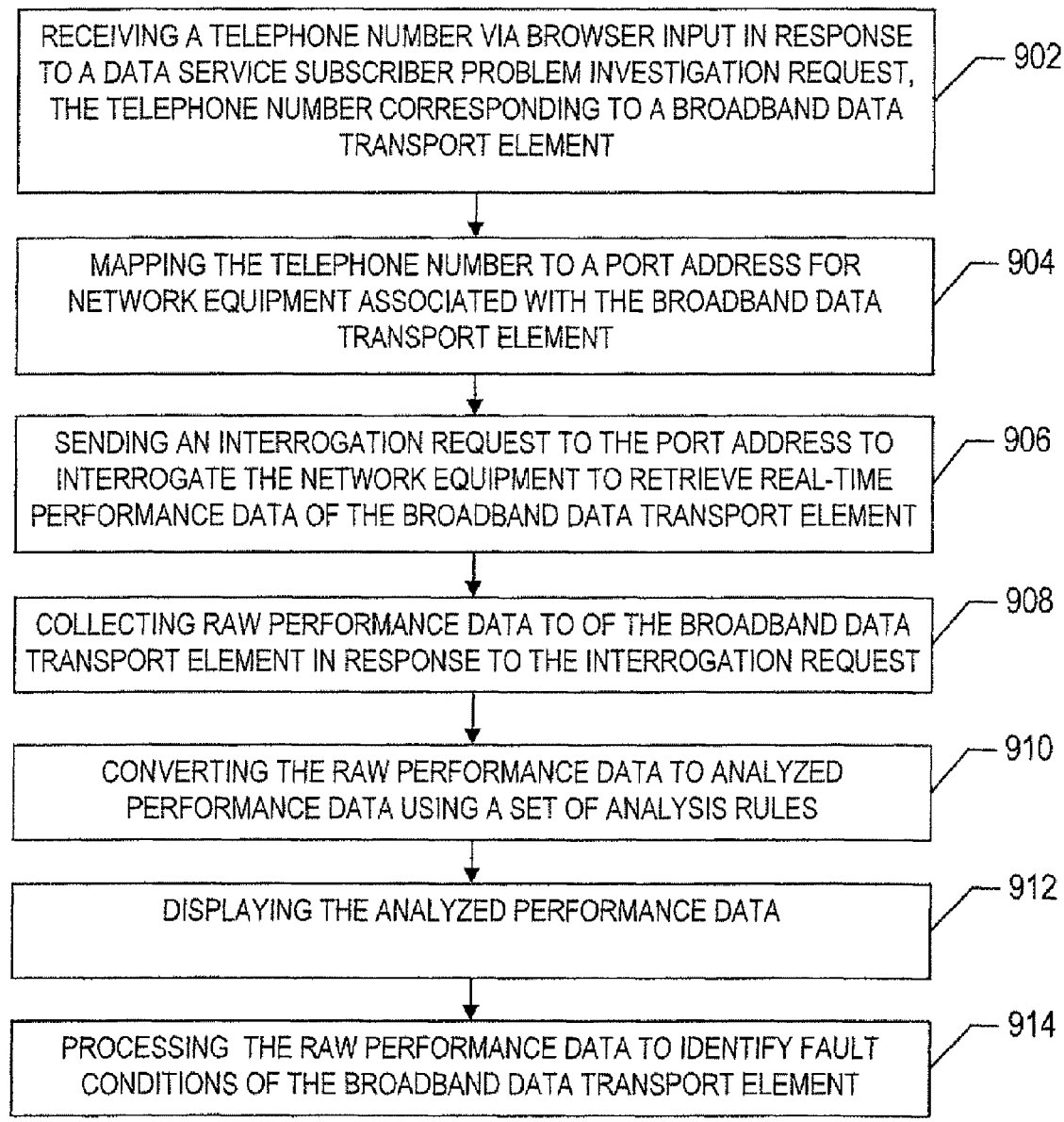
FIG. 9 is a flow chart that illustrates another particular embodiment of a method of accessing and displaying DSL data.

Referring to FIG. 9, another illustrative method of operation is shown. A telephone number is received via a browser input in response to a data service subscriber problem investigation request, at step 902. The telephone number corresponds to a broadband data transport element. The telephone number is mapped to a port address for network equipment that is associated with the broadband data transport element, at 904. An interrogation request to the port address is sent to interrogate the network equipment in order to retrieve real time performance data of the broadband data transport element, as shown at step 906. Raw performance data is collected for the broadband data transport element in response to the interrogation request, at 908. Raw performance data collected is then converted to analyze performance data using a set of analysis rules, at 910. Analyzed performance data is then displayed, at 912, and the performance data may optionally be processed further to identify fault conditions of the broadband data transport element, as shown at step 914. The identified fault conditions may also be displayed in an operations report via a web browser user interface or other user interface, In a particular embodiment, the broadband transport element is a data modem, such as an asynchronous digital subscriber line (ADSL) modem, The raw performance data is collected while the transport element remains in operation. By performing data collection while the transport elements remain in operation, downtime maintenance is advantageously reduced.

The disclosed system and method provides for automated remote collection of performance data directly from network elements and a method for analysis of training session data to determine indications of fault conditions. The disclosed system and method provides access to real time data and real-time data analysis tools for operations personnel. The system disclosed presents a network architecture of servers that cooperatively support different working group access to ADSL provisioning and performance data using a common set of analytical tools. The system provides for a user-friendly web browser interface for system access and shared methods for interacting with the system by various working groups. Data is extracted from production ADSL equipment in real-time with respect to particular ADSL telephone numbers. Network equipment configuration information is also provided to operations personnel to assist in resolving circuit performance provisioning issues. Examples of circuit provisioning parameters that may be observed by various working groups includes ADSL equipment port status, ATM cross-connect status or alarms status, in service, or out of service data.

The system also provides features such as traffic flow control that is instituted to reduce operational overload conditions. The system provides for a basic inquiry identified by a telephone number that is tied to provisioning flows and maintenance via a remote automated system. In addition, the system polices the accuracy of its telephone number look-up database by polling network equipment on a periodic basis, such as daily or weekly, to cross-check the provisioned assignment with actual field configurations. In addition, the system may support thousands of real-time users over a geographically diverse area and features a historical log that is tagged by telephone numbers that may be accessed by working groups to record historical trouble events or pass along other operator comments. Further, the system supports a method of operation that is automated and provides for performance measurements without requiring special test equipment or special personnel dispatch to the field for analysis. Real-time collection and analysis rules may be used beneficially to discover line problems at an early point of detection to reduce service impact. Reducing reliance on on-site technicians allows the system to support management at a centralized site that covers a wide range of area.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
    an input to receive a request including a telephone number corresponding to a broadband data transport element;
    logic to map the telephone number to a port address of network equipment associated with the broadband data transport element and to poll a plurality of provisioning data for a plurality of deployed network equipment to crosscheck provisioned assignment data used in connection with mapping the telephone number to the port address with field configurations of the plurality of deployed network equipment; and
    a performance analysis tool to determine performance information based on data collected from interrogating the broadband data transport element, wherein the data is collected via a wireline connection to the broadband data transport element.

2. The system of claim 1, wherein the broadband data transport element comprises a digital subscriber line element.

3. The system of claim 2, wherein the network equipment comprises a digital subscriber line access multiplexer (DSLAM) and wherein the digital subscriber line element is located remotely from the DSLAM.

4. The system of claim 1, wherein the broadband data transport element comprises a digital subscriber line element, wherein determining performance information associated with the broadband data transport element includes receiving performance data associated with the broadband data transport element in response to an interrogation request and analyzing the performance data.

5. The system of claim 4, further comprising an interface adapted to report the analyzed performance data to two or more remote entities concurrently.

6. The system of claim 5, wherein a first entity of the two or more remote entities is an internet service provider and a second entity of the two or more remote entities is a local exchange carrier.

7. The system of claim 1, wherein determining performance information associated with the broadband data transport element includes identifying a faulty operation indicator associated with the broadband data transport element based on performance data associated with the broadband data transport element.

8. The system of claim 7, wherein the faulty operation indicator corresponds to a condition that reduces a data rate of the broadband data transport element, wherein the faulty operation indicator includes at least one of a bridge tap fault, a single frequency interference fault, and a disturber circuit fault.

9. The system of claim 1, wherein the performance information associated with the broadband data transport element comprises real-time performance testing information, wherein the broadband data transport element is an asynchronous digital subscriber line (ADSL) modem.

10. The system of claim 1, wherein the logic is adapted to generate provisioning status data based on the data collected from interrogating the broadband data transport element, wherein the provisioning status data is selected from a group consisting of powered on, powered off, attempting to synchronize, and in synchronization.

11. The system of claim 1, wherein the logic is adapted to query a provisioning database to provide a newly provisioned telephone number associated with the port address.

12. A method comprising:
receiving a request including a telephone number corresponding to a broadband data transport element;
mapping the telephone number to a port address of network equipment associated with the broadband data transport element;
determining performance information based on data collected from interrogating the broadband data transport element, wherein the data is collected via a wireline connection to the broadband data transport element;
sending a provisioning status request related to the port address to determine a provisioning status associated with the broadband data transport element;
generating provisioning status data based on provisioning data collected by interrogating the broadband data transport element, wherein the provisioning status data includes circuit provisioning parameters selected from one or more of equipment port status, cross connect status, alarm status, and in-service status;
polling a plurality of provisioning data for a plurality of deployed network equipment to crosscheck provisioned assignment data used in connection with mapping the telephone number to the port address with field configurations of the plurality of deployed network equipment, wherein the plurality of deployed network equipment is located in a geographically diverse area including a plurality of different states; and
generating at least one report including the performance information.

13. The method of claim 12, wherein generating the at least one report including the performance information comprises:
generating a first report including the performance information for display to a first user associated with a first entity; and
generating a second report including the performance information for display to a second user associated with a second entity.

14. The method of claim 12, further comprising
creating a log file to record historical trouble events and comments, the log file accessible to a plurality of operational personnel working groups.

15. A non-transitory computer-readable medium having instructions that, when executed by a computer, cause the computer to:
receive a request including a telephone number corresponding to a broadband data transport element;
map the telephone number to a port address of network equipment associated with the broadband data transport element;
determine performance information based on data collected from interrogating the broadband data transport element, wherein the data is collected via a wireline connection to the broadband data transport element;
send a provisioning status request related to the port address to determine a provisioning status associated with the broadband data transport element;
generate provisioning status data based on provisioning data collected by interrogating the broadband data transport element, wherein the provisioning status data includes circuit provisioning parameters selected from one or more of equipment port status, cross connect status, alarm status, and in-service status; and
generate at least one report including the performance information.

16. The non-transitory computer-readable medium of claim 15, wherein determining the performance information associated with the broadband data transport element comprises identifying fault conditions associated with the broadband data transport element.

17. The system of claim 1, wherein the logic is adapted to generate provisioning status data based on the data collected by interrogating the broadband data transport element, wherein the provisioning status data includes circuit provisioning parameters selected from one or more equipment port status, cross connect status, alarm status, and in-service status.

18. The system of claim 17, wherein the logic is further adapted to send a provisioning status request to the port address of the network equipment to determine a provisioning status of the broadband data transport element.

19. The system of claim 17, wherein the plurality of deployed network equipment is located in a geographically diverse area including a plurality of different states.

20. The non-transitory computer-readable medium of claim 15, further comprising instructions that, when executed by the computer, cause the computer to poll a plurality of provisioning data for a plurality of deployed network equipment to crosscheck provisioned assignment data used in connection with mapping the telephone number to the port address with field configurations of the plurality of deployed network equipment, wherein the plurality of deployed network equipment is located in a geographically diverse area including a plurality of different states.

* * * * *